(12) United States Patent
Scott et al.

(10) Patent No.: US 12,096,314 B2
(45) Date of Patent: Sep. 17, 2024

(54) LOCATION AWARE ASSIGNMENT OF RESOURCES FOR PUSH TO TRANSFER (PTT) COMMUNICATION SYSTEMS IN A FIFTH GENERATION (5G) NETWORK OR OTHER NEXT GENERATION WIRELESS COMMUNICATION SYSTEM

(71) Applicants: AT&T Intellectual Property I, L.P., Atlanta, GA (US); AT&T Mobility II LLC, Atlanta, GA (US)

(72) Inventors: Lan Scott, Redmond, WA (US); Jerry Shih, Cumming, GA (US); Junan Peng, Bellevue, WA (US); Erie Lai Har Lau, Redmond, WA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 18/148,680

(22) Filed: Dec. 30, 2022

(65) Prior Publication Data
US 2023/0143615 A1 May 11, 2023

Related U.S. Application Data

(63) Continuation of application No. 16/919,265, filed on Jul. 2, 2020, now Pat. No. 11,570,586.

(51) Int. Cl.
*H04W 4/10* (2009.01)
*H04W 76/15* (2018.01)
(Continued)

(52) U.S. Cl.
CPC ............ *H04W 4/10* (2013.01); *H04W 76/15* (2018.02); *H04L 12/189* (2013.01); *H04W 88/16* (2013.01)

(58) Field of Classification Search
CPC ....... H04W 4/10; H04W 76/15; H04W 88/16; H04L 12/189
See application file for complete search history.

(56) References Cited

U.S. PATENT DOCUMENTS 6,704,576 B1 * 3/2004 Brachman ............... H04L 67/63
455/503
9,763,182 B1 * 9/2017 Krishnamurthy ..... H04W 48/18
(Continued)

OTHER PUBLICATIONS

"3rd Generation Partnership Project; Technical Specification Group Services and System Aspects; Common functional architecture to support mission critical services; Stage 2 (Release 17)" 3GPP, 3GPP TS 23.280 V17.2.0 (Mar. 2020), 252 pages.
(Continued)

*Primary Examiner* — Raymond S Dean
(74) *Attorney, Agent, or Firm* — Guntin & Gust, PLC; Douglas Schnabel

(57) ABSTRACT

The technologies described herein are generally directed to facilitating operation of system that can include a processor and a memory that stores executable instructions that, when executed by the processor, facilitate performance of operations. In embodiments, the operations can include receiving, from a source user equipment, a first request to communicate to a destination group of user equipment via a multi-cast connection. Further operations can include identifying respective service areas of ones of the destination group, comprising a service area of a destination user equipment of the destination group. In some embodiments, operations can include generating a second request to initiate the multi-cast connection, the second request comprising the destination group of user equipment with the respective service areas, wherein the respective service area of the destination user
(Continued)

equipment is for selection, by second network equipment based on the service area, a gateway group of base station equipment.

20 Claims, 10 Drawing Sheets

(51) Int. Cl.
*H04L 12/18* (2006.01)
*H04W 88/16* (2009.01)

(56) References Cited

U.S. PATENT DOCUMENTS

| | | | |
|---|---|---|---|
| 2006/0154660 A1 | 7/2006 | Waugh et al. | |
| 2009/0059832 A1* | 3/2009 | Jhamnani | H04W 72/30 |
| | | | 370/312 |
| 2010/0093312 A1 | 4/2010 | Roh et al. | |
| 2010/0248742 A1* | 9/2010 | Song | H04L 12/185 |
| | | | 455/456.1 |
| 2010/0261494 A1 | 10/2010 | Tiwari et al. | |
| 2011/0105151 A1* | 5/2011 | Hall | A63F 13/95 |
| | | | 455/456.3 |
| 2012/0089814 A1* | 4/2012 | Gupta | G06F 9/4405 |
| | | | 712/30 |
| 2014/0153471 A1* | 6/2014 | Zhang | H04W 4/06 |
| | | | 370/312 |
| 2015/0303950 A1* | 10/2015 | Shattil | H04B 1/0003 |
| | | | 370/328 |
| 2017/0034672 A1* | 2/2017 | Pai | H04W 8/186 |
| 2017/0063590 A1* | 3/2017 | Dhananjay | H04L 27/2675 |
| 2017/0099327 A1* | 4/2017 | Negalaguli | H04L 67/01 |
| 2019/0274130 A1 | 9/2019 | Cheng et al. | |
| 2021/0204359 A1 | 7/2021 | Pai et al. | |

OTHER PUBLICATIONS

Office Action mailed Sep. 8, 2021 for U.S. Appl. No. 16/919,265, 25 pages.
Office Action mailed Oct. 25, 2021 for U.S. Appl. No. 16/919,265, 23 pages.
Office Action mailed Jan. 7, 2022 for U.S. Appl. No. 16/919,265, 22 pages.
Office Action mailed Jun. 6, 2022 for U.S. Appl. No. 16/919,265, 32 pages.
Notice of Allowance mailed Sep. 23, 2022 for U.S. Appl. No. 16/919,265, 32 pages.

* cited by examiner

LOCATION AWARE ASSIGNMENT OF RESOURCES FOR PUSH TO TRANSFER (PTT) COMMUNICATION SYSTEMS IN A FIFTH GENERATION (5G) NETWORK OR OTHER NEXT GENERATION WIRELESS COMMUNICATION SYSTEM

RELATED APPLICATION

The subject patent application is a continuation of, and claims priority to, U.S. patent application Ser. No. 16/919,265, filed Jul. 2, 2020, and entitled "LOCATION AWARE ASSIGNMENT OF RESOURCES FOR PUSH TO TALK (PTT) COMMUNICATION SYSTEMS IN A FIFTH GENERATION (5G) NETWORK OR OTHER NEXT GENERATION WIRELESS COMMUNICATION SYSTEM," the entirety of which priority application is hereby incorporated by reference herein.

TECHNICAL FIELD

The subject application is related to network connectivity in a 5G or other next generation wireless communication system, and, for example, connectivity for push to transfer service communications.

BACKGROUND

Different network communication services have been developed over time to address the needs of different customers. The push to talk (PTT) service has different characteristics that can meet service demands for certain users with mission critical communications and fast setup requirements, e.g., first responders, utilities, and railways.

Because PTT service connections may require the system to establish connections with multiple devices simultaneously, problems can occur when different devices, in different locations, and with different capabilities, must all be combined in a PTT session.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
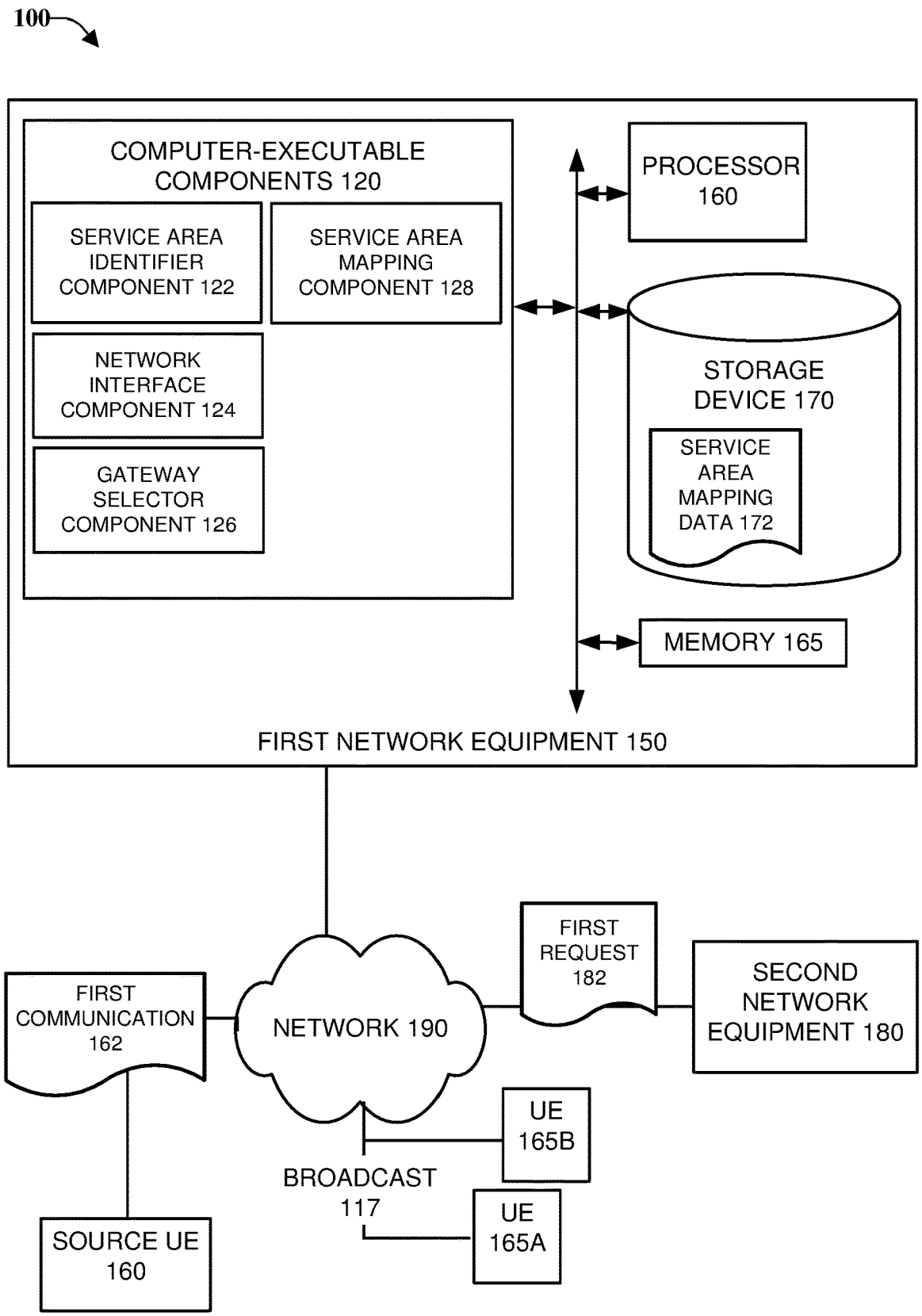
FIG. 1 is an architecture diagram of an example system that can facilitate location-based allocation of resources for PTT service communications, in accordance with one or more embodiments.

Generally speaking, one or more embodiments described herein can facilitate location-based assignment (also termed location aware assignment) of resources for PTT service communications, using different approaches. By employing different approaches to allocating resources to PTT connections, one or more embodiments described herein can improve PTT setup times, promote high availability, increase reliability, and facilitate priority handling of communications. In addition, one or more embodiments described herein can be directed towards a multi-connectivity framework that supports the operation of New Radio (NR, sometimes referred to as 5G). As will be understood, one or more embodiments can allow an integration of user devices with network assistance, by supporting control and mobility functionality on cellular links (e.g., long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS).

As described further below, in some embodiments, one or more of the non-limiting terms "relay node," "mobile relay node," "anchor node," and "mobile base station" can describe mobile relay nodes supporting mobile networks. It should be appreciated that notwithstanding some descriptions herein referring to concepts of wireless base stations being "fixed," "stationary" or similar terms, and "mobile," "nonfixed" or similar terms, these terms describing a capacity for movement are not limiting, e.g., in different embodiments, a mobile base station described herein can be fixed in position, and vice versa.

In some embodiments the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity.

Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies. Some embodiments are described in particular with example implementations in 5G NR systems. The embodiments are however applicable to any radio access technology (RAT) or multi-RAT system where the user equipment operates using multiple carriers.

The computer processing systems, computer-implemented methods, apparatus and/or computer program products described herein employ hardware and/or software to solve problems that are highly technical in nature (e.g., rapidly evaluating criteria, and allocating resources for communications in different protocols), that are not abstract and cannot be performed as a set of mental acts by a human. For example, a human, or even a plurality of humans, cannot efficiently select from two or more base stations based on location, device capabilities, and message types (which generally cannot be performed manually by a human) with the same level of accuracy and/or efficiency as the various embodiments described herein.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 is an architecture diagram of an example system 100 that can facilitate location-based allocation of resources for PTT communications, in accordance with one or more embodiments. For purposes of brevity, description of like elements and/or processes employed in other embodiments is omitted. As depicted, system 100 includes first network equipment 150, second network equipment 180, network 190, source UE 160, and destination UEs 165A-B. According to multiple embodiments, first network equipment 150 can include memory 165 that can store one or more computer and/or machine readable, writable, and/or executable components 120 and/or instructions that, when executed by processor 160, can facilitate performance of operations defined by the executable component(s) and/or instruction(s). As discussed below, first network equipment 150 can further include storage device 170.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure. With respect to additional information stored by first network equipment 150, as depicted storage device 170 stores service ae According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

Figure 10:
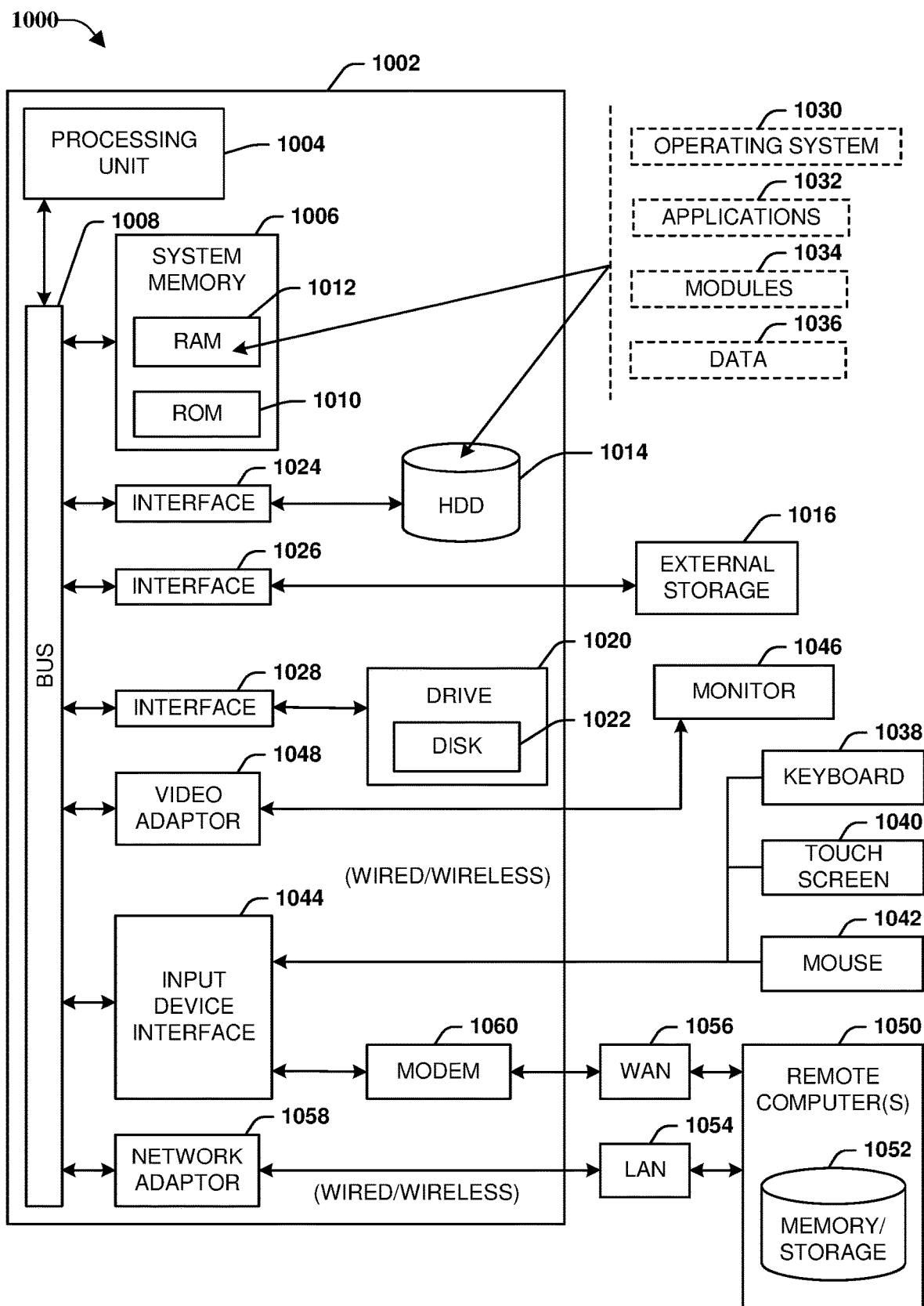
FIG. 10 illustrates an example block diagram of an example computer operable to engage in a system architecture that can facilitate processes described herein, in accordance with one or more embodiments.

As discussed further with FIG. 10, network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers.

It should be appreciated that the embodiments of the subject disclosure depicted in various figures disclosed herein are for illustration only, and as such, the architecture of such embodiments are not limited to the systems, devices, and/or components depicted therein. For example, in some embodiments, first network equipment 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

In one or more embodiments, memory 165 can store computer and/or machine readable, writable, and/or executable components 120 and/or instructions that, when executed by processor 160, can facilitate execution of the various functions described herein relating to service area identifier component 122, network interface component 124, gateway selector component 126, service area mapping component 128, as well as other components to implement and provide functions to system 100, and some other embodiments described herein.

In an example, memory 165 can store executable instructions that can facilitate generation of a network interface component, which can in some implementations facilitate receiving a first request from second network equipment, to communicate a first communication to a destination group of user equipment via a first multi-cast connection to the destination group of user equipment.

For example, in one or more embodiments, instructions can facilitate generation of a network interface component 124, which can in some implementations facilitate receiving a first request 182 from second network equipment 180, to communicate a first communication 162 to a destination group of user equipment (e.g., from UE 160) via a first multi-cast connection (e.g., broadcast 117) to the destination group of user equipment 165A-B. As discussed further in examples herein, in some implementations, the communications between UE 160 and UEs 165A-B are facilitated by PTT service, and can allocate resources in network 190.

Memory 165, in some examples, can further store executable instructions that, when executed by processor 160, facilitate generation of a service area identifier component, which can in some implementations facilitate identifying, by the first network equipment, a first service area of a second user equipment of the destination group of user equipment.

For example, in one or more embodiments, executable instructions can facilitate generation of a service area identifier component 122, which can in some implementations facilitate identifying, by the first network equipment, a first service area of a second user equipment of the destination group of user equipment. At this stage of the explanation of one or more embodiments described herein, the service area identified by the service area identifier can broadly correspond to geographic location of a destination UE for a message from source UE 160, with UEs 165A-B being in the same or different service areas.

In one or more embodiments, memory 165 can further store executable instructions that, when executed by processor 160, facilitate generation of a gateway selector component, which can in some implementations facilitate selecting, by the first network equipment, based on the first service area, a first gateway group of base station equipment for establishment of the first multi-cast connection with ones of the destination group of user equipment, comprising the second user equipment. Gateway groups are described in further detail below with the description of FIGS. 3-5. For example, in the example depicted in FIG. 3, gateway selector component 126 can facilitate selecting, by the first network equipment, based on the first service area, a first gateway group of base station equipment for establishment of the first multi-cast connection (e.g., broadcast 117) with ones of the destination group of UEs 165A-B. As described further below, the first gateway group can correspond to resources allocated based on the identified service area, e.g., base stations that can communicate the PTT messages to proximate destination UE groups, such as UEs 165A-B.

In exemplary embodiments, systems 100 can implement a system that includes PTT communications, e.g., source UE 160 can direct PTT communications to UEs 165A-B with the communication being delivered by a broadcast 117 method. As discussed further with FIG. 3 below, to implement the systems, first network equipment 150 can include functions of broadcast multicast service center (BM-SC) equipment, and second network equipment 180 can include functions of network equipment that can coordinate PTT communications, as discussed further below, e.g., see discussion of FIGS. 2-3 below.

Figure 2:
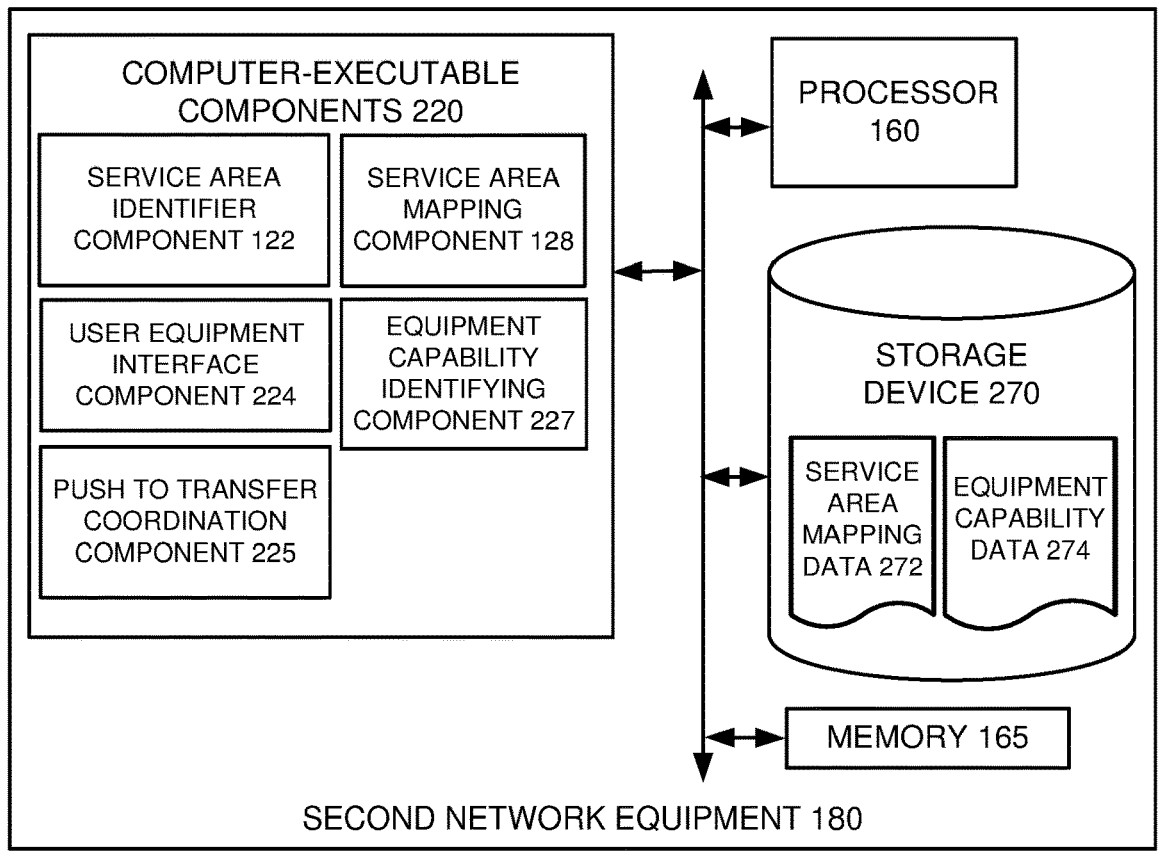
FIGS. 2-3 illustrate an example the operation of, and linkages between the different components of a system that can facilitate location-based allocation of resources for PTT service communications, in accordance with one or more embodiments.
Figure 3:
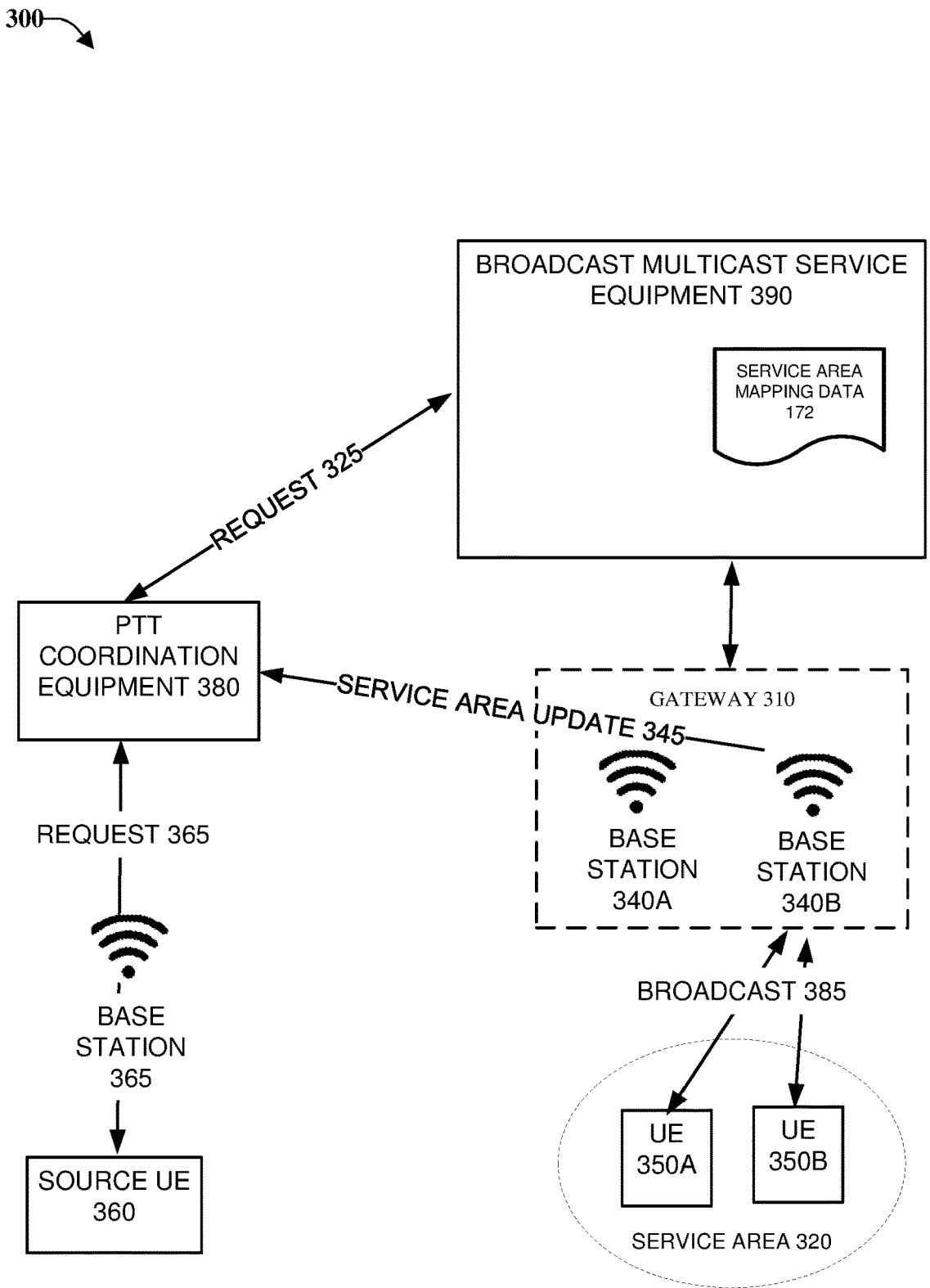

FIGS. 2-3 are discussed in this section to illustrate the operation of, and linkages between the different components discussed above, e.g., first network equipment 150, second network equipment 180, source UE 160, as well as new elements and depicted in FIGS. 2-3. FIG. 2 is an architecture diagram of a non-limiting example 200 of components of second network equipment 180 discussed above, in accordance with one or more embodiments.

System 200 can include second network equipment 180 linked via network 190 to first network equipment 150, network 190, source UE 160, and destination UEs 165A-B. Second network equipment 180 can also include storage device 270 which can store for one or more embodiments, service area mapping data 172 (e.g., as introduced with FIG. 1 above) and equipment capability data 274, discussed below. According to multiple embodiments, second network equipment 180 can include memory 165 that can store one or more computer and/or machine readable, writable, and/or executable components 220 and/or instructions that, when executed by processor 160, can facilitate performance of operations defined by the executable component(s) and/or instruction(s). For example, similar to computer-executable components 120 of FIG. 1, when executed by processor 160, computer-executable components 120 can facilitate execution of the various functions described herein relating to service area identifier component 122, user equipment interface component 224, push to transfer coordination component 225, service area mapping component 128, equipment capability identifying component 227, as well as other components to implement and provide functions to system 200 and some other embodiments described herein.

In the example depicted in FIG. 3., broadcast multicast service center equipment 390 is included as an example component that can be used for functions described for first network equipment 150. In one or more embodiments described herein, broadcast multicast service center equipment 390 can also be termed a BM-SC (broadcast/multicast service center), and this equipment can provide functions including, but not limited to, content ingestion, preparation and transmission of content to UEs, session control signaling, session management, service announcement, file repair, reception reporting, security, and user authentication. In addition, gateway 310 (also termed MBMS-GW (MBMS Gateway)) is depicted as a dotted line delineated group of access points (e.g., base stations 340A-B), and the management of gateway can be managed by broadcast multicast service center equipment 390 or other gateway management network equipment (not shown). Gateway 310 management functions can include, but are not limited to, assigning transport network multicast IP addresses, originating transport network multicast to distribute eMBMS user plane data to eNodeBs (e.g., base stations 340A-B), and session control signaling to multicell/multicast coordination entities (MCE) via mobility management entities (MME) (not shown).

Returning to FIG. 3, broadcast multicast service center equipment 390 and PTT coordination equipment 380 can utilize components described with FIG. 2 above to perform different functions. For example, memory resources in broadcast multicast service center equipment 390 can store executable instructions that can facilitate generation of network interface component 124, which can, in some implementations facilitate receiving first request 325 from PTT coordination equipment 380, to communicate a PTT communication from source UE 360 to a destination group of user equipments 350A-B via a multi-cast connection (e.g., broadcast 485) to the destination group of user equipment. Memory 165, can further store executable instructions that, when executed by processor 160 of broadcast multicast service center equipment 390, facilitate generation of service area identifier component 122, which can in some implementations facilitate identifying, by broadcast multicast service center equipment 390, service area 320 of destination group UEs 350B-C.

In one or more embodiments, additional executable instructions can be utilized by one or more embodiments that, when executed by processor 160, facilitate generation of gateway selector component 126, which can, in some implementations, facilitate selecting, by the first network equipment, based on the first service area, a gateway group of base stations for establishment of the multi-cast connection, with ones of the destination group of user equipments. Thus, continuing this example, PTT coordination equipment 380 can receive a request 365 from source UE 360, with destination UEs 350A-B specified. Base stations 340A-B are included in gateway 310, with base station 340B communicatively coupled to UE 350A-B by broadcast 385, to UEs in service area 320.

In the example depicted in FIG. 3, PTT coordination equipment 380 can receive request 365 with user equipment interface component 224, and formulate request 325 for forwarding to broadcast multicast service center equipment 390, e.g., by PTT coordination component 225. In some implementations, request 325 can include identifiers of the members of a destination group selected by a user of source UE 360, e.g., UEs 350A-B.

In an additional combination of activities that add detail to the examples above, in FIG. 3, the destination UEs 350A-B included in request 365 from source UE 360 can be used to identify the service areas of the destination UEs, e.g., by service area identifier component 122 of FIG. 2 retrieving this service area data stored in service area mapping data 272 of second network equipment 180, e.g., service area mapping data 272 can store that 350A-B are currently in service area 320.

It should be noted that, as used herein, a service area can have a meaning similar to the meaning of service area identifier, e.g., an identifier assigned to a geographic area including one or more base stations. As discussed throughout the present application, service areas (e.g., service area 320) can be used to direct communications traffic to wireless resources (e.g., base stations 340A-B) geographically proximate to destination UEs (e.g., UEs 350A-B). Although a single service area 320 is discussed with FIG. 3, it a feature of some embodiments to utilize different criteria to select from multiple available service areas 320 and to provide coverage to multiple selected service areas 320.

Continuing this example, the determined service area 320 can be used to generate request 325 for communication to broadcast multicast service equipment 390 (e.g., similar to second device 180 of FIG. 2) where service area mapping data 172 can be used to identify one or more gateways (e.g., gateway 310) that can be advantageously used to deliver communications to the destination UEs, e.g., because selected gateway 310 has resources (e.g., base stations 340A-B) that are geographically proximate to the destination UEs 350A-B in service area 320.

In one or more embodiments, in the course of operations of the provider network, PTT coordination equipment 380 can be updated with new service areas, e.g., as UEs 350A-B move out of service area 320. Different approaches can be used to update current service area status of UEs 350A-B. For example, in one or more embodiments, service area mapping component 128 can receive service area information from different sources. For example, when both a UE and a serving base station (e.g., an eNodeB) are capable (e.g., eMBMS capable), then the base station can receive updated service area information (e.g., also termed a service area identity in some embodiments) and then relay this information to PTT coordination component 380, e.g., as depicted in FIG. 3, by service area update 345. In this example, both base station 340B and UE 350B can be eMBMS capable, the current service area 320 and any subsequent updates can be relayed to PTT coordination component 380 for use in updating service area mapping data 272, and for use generating request 325.

Figure 4:
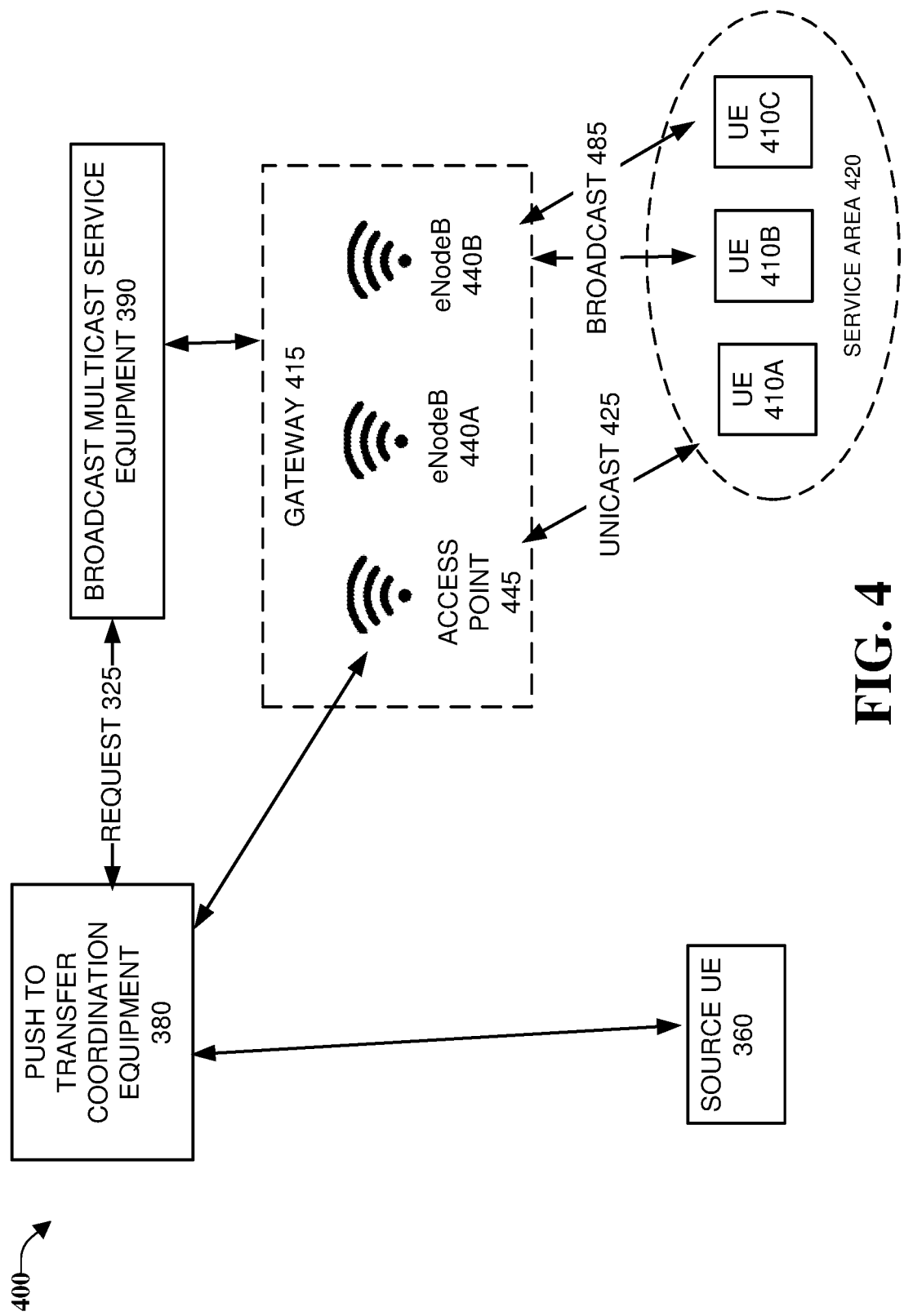
FIG. 4 illustrates an example diagram of a non-limiting example system that can facilitate location-based allocation of resources for PTT service communications, in accordance with one or more embodiments.

FIG. 4 discussed below, provides additional details about the processes describe above, and also introduces additional features of embodiments, such as utilizing PTT coordination equipment 390 to evaluate capabilities of UEs requesting PTT connections, e.g., with equipment capability identifying component 227.

FIG. 4 illustrates an example diagram of non-limiting example system 400 that can facilitate location-based allocation of resources for PTT communications, in accordance with one or more embodiments. For purposes of brevity, description of like elements and/or processes employed in other embodiments is omitted.

System 400 can include broadcast multicast service center equipment 390 communicatively coupled to PTT coordination equipment 380, with the former directing communication to UEs 410B-C via broadcast 485, and the later directing unicast 425 communication via access point 445 to UE 410A. Source UE 360 is depicted as communicatively coupled to PTT coordination equipment 380.

It should be noted that, in different implementations of PTT service, at least two transport methods can be used to deliver data, and the example of FIG. 4 includes two different types of connections to destination UEs 410A-C, e.g., eMBMS broadcast 485, and non-MBMS unicast 425. As depicted in FIG. 4, with UEs 410A-C being in a destination group for a communication from source UE 360, UEs 410B-C are depicted as receiving broadcast 485 communication from eNodeBs 440A-B, and UE 410A receives unicast 425 delivery of the PTT communication, e.g., from access point 445. Different approaches to selecting which communications are subject to delivery in this way are discussed further below.

For example, in one or more embodiments, PTT coordination equipment 380 can receive, from a source UE 360, a first request to communicate a communication to the destination group of user equipment. As described above, in some embodiments, the service areas of the destination group UEs 410A-C can be determined. In an additional feature, in one or more embodiments, capabilities of different system components can also be assessed, e.g., by equipment capability identifying component 227. In an example, these capabilities include the capacity for communication using multicast/broadcast mode (MBMS) or enhanced MBMS (eMBMS). In some implementations, evaluating capabilities by PTT coordination equipment 390 can facilitate splitting PTT communications to MBMS and non-MBMS delivery resources. In some circumstances, this splitting can increase the use of MBMS for communication, e.g., with resulting improvements in communication efficiency, setup speed, and capacity for dynamic changes in communication structures.

As noted above, to utilize the MBMS (e.g., broadcast 485) from eNodeB 440B, both the base station (e.g., eNodeB 440B) and a destination UE (e.g., UEs 410B-C) have a capacity to utilize MBMS for PTT communications. In this example, neither access point 445 (e.g., legacy base station equipment) nor UE 410A have MBMS capabilities and, upon PTT coordination equipment 390 receiving UE 410A included in destination UEs for the PTT communication from source node 340, this lack of MBMS capability can be detected (e.g., by equipment capability identifying component 227) and access point 445 can be selected, e.g., based on the inclusion of this resource in gateway 310 and the proximity of gateway 310 resources for service area 420. Stated differently, when capabilities are detected in a destination UE (e.g., UEs 410B-C) that are implicated by available access point resources (e.g., eNodeB 440A-B) this route can be utilized by one or more embodiments.

Figure 5:
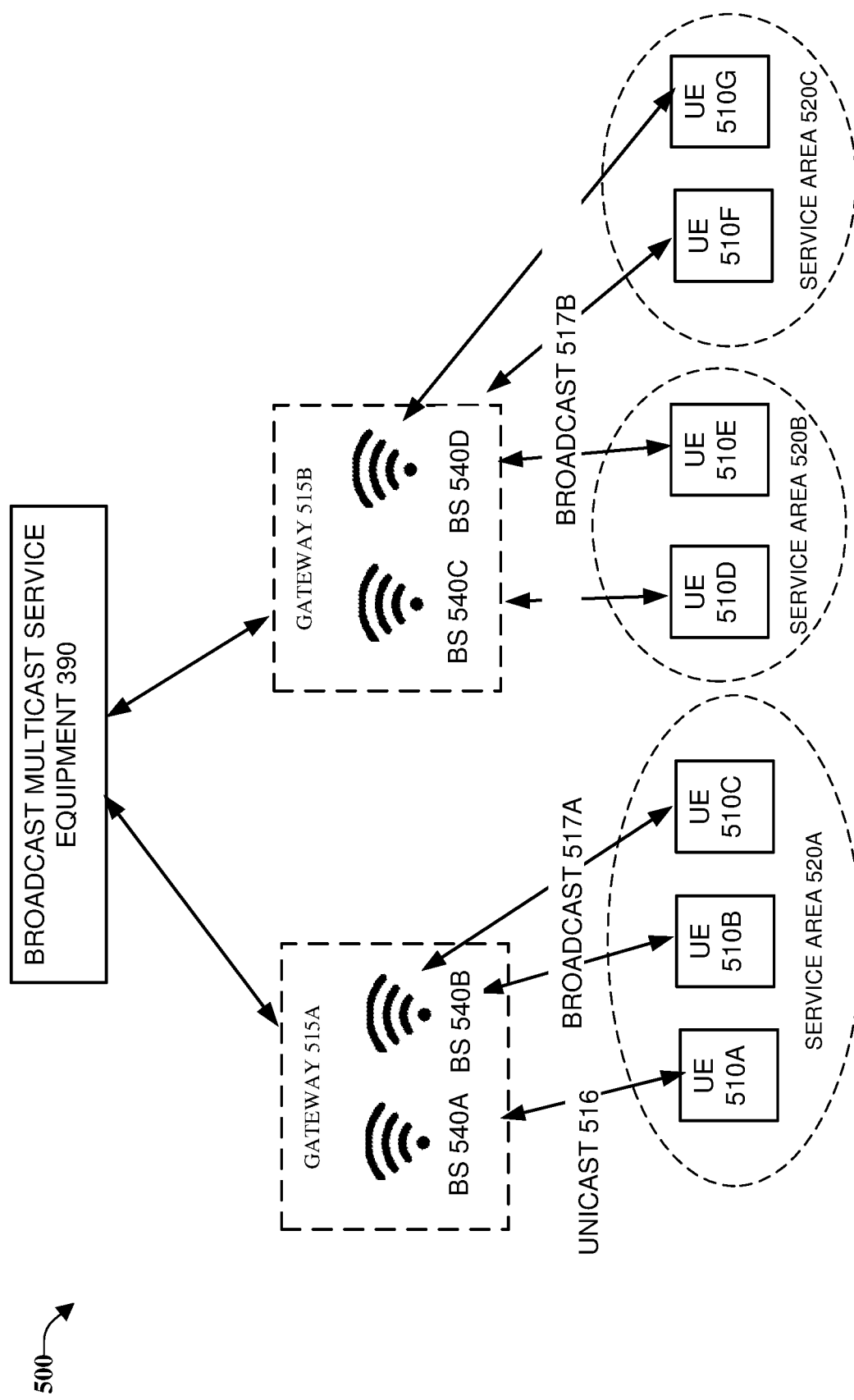
FIG. 5 illustrates an example diagram of a non-limiting example system that can location-based allocation of resources for PTT service communications by splitting PTT traffic between selected gateways based on a service area list, in accordance with one or more embodiments.

FIG. 5 illustrates an example diagram of non-limiting example system 500 that can location-based allocation of resources for PTT communications by splitting PTT traffic between selected gateways based on a service area list, in accordance with one or more embodiments. For purposes of brevity, description of like elements and/or processes employed in other embodiments is omitted.

As depicted, system 500 includes broadcast multicast service center equipment 390 communicatively coupled MBMS capable base stations 540A-B in gateway 515A and BS 540C-D in gateway 515B. In this example, a destination group for a PTT communication includes MBMS capable UEs 510B-G, with UE 510A not having MBMS capabilities.

As depicted in FIG. 5, when there are multiple MBMS-GWs (e.g., gateways 515A-B) deployed into network, a BM-SC (e.g., broadcast multicast service center equipment 390) can have the additional capability to split traffic to selected MBMS-GWs. In this example, gateways 515A-B can be selected based on a service area list (SA list) from PTT coordination equipment 380, also termed content provider server in some embodiments. For example, gateway 515A serves service area 520A and gateway 515B serves service areas 520B-C. Based on this mapping, if, for example, the destination list of UEs only included UEs 510B-C, then broadcast multicast service center equipment 390 would only deliver the associated traffic to the resources of gateway 515A for delivery by broadcast 517A. Alternatively, if the destination UEs include UEs 510B-C and 510E, then both gateways 515A-B can be utilized by one or more embodiments.

Returning to a discussion of non-MBMS capable UE 510A, when this UE is included in a destination list, one or more embodiments can direct associated traffic to gateway 515A, and an MBMS capable access point (e.g., BS 540A) can be used to communicate the traffic via a non-MBMS method, e.g., unicast 516.

Figure 6:
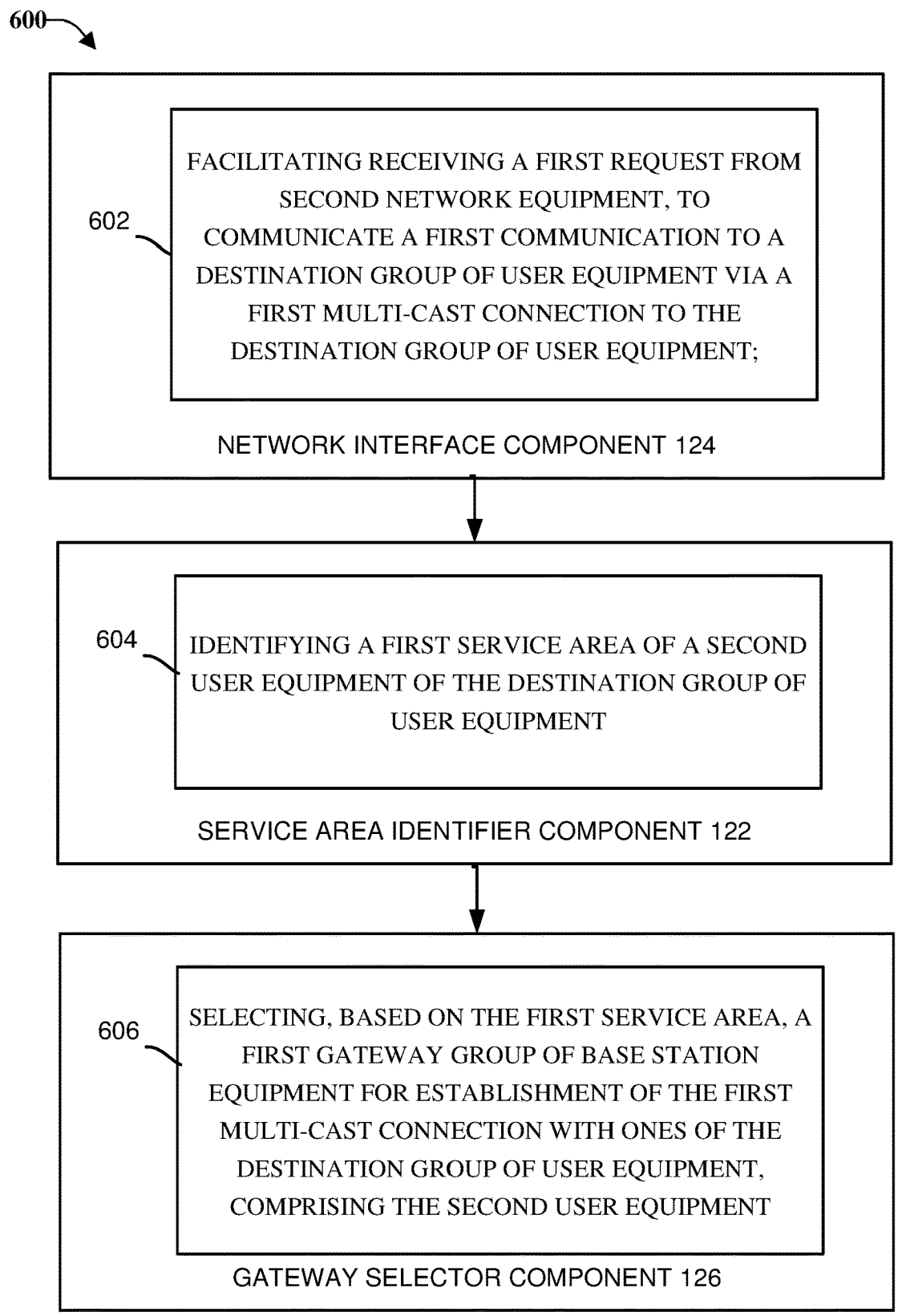
FIG. 6 illustrates an example system that can facilitate location-based allocation of resources for PTT service communications, in accordance with one or more embodiments.

FIG. 6 illustrates an example system 600 that can facilitate location-based allocation of resources for PTT communications, in accordance with one or more embodiments. For purposes of brevity, description of like elements and/or processes employed in other embodiments is omitted.

In one or more embodiments, network interface component 124 can be configured to facilitate receiving a first request from second network equipment, to communicate a first communication to a destination group of user equipment via a first multi-cast connection to the destination group of user equipment. In one or more embodiments, service area identifier 12 can be configured to identify a first service area of a second user equipment of the destination group of user equipment.

In one or more embodiments, gateway selector component 126 can be configured to select, based on the first service area, a first gateway group of base station equipment for establishment of the first multi-cast connection with ones of the destination group of user equipment, comprising the second user equipment.

Figure 7:
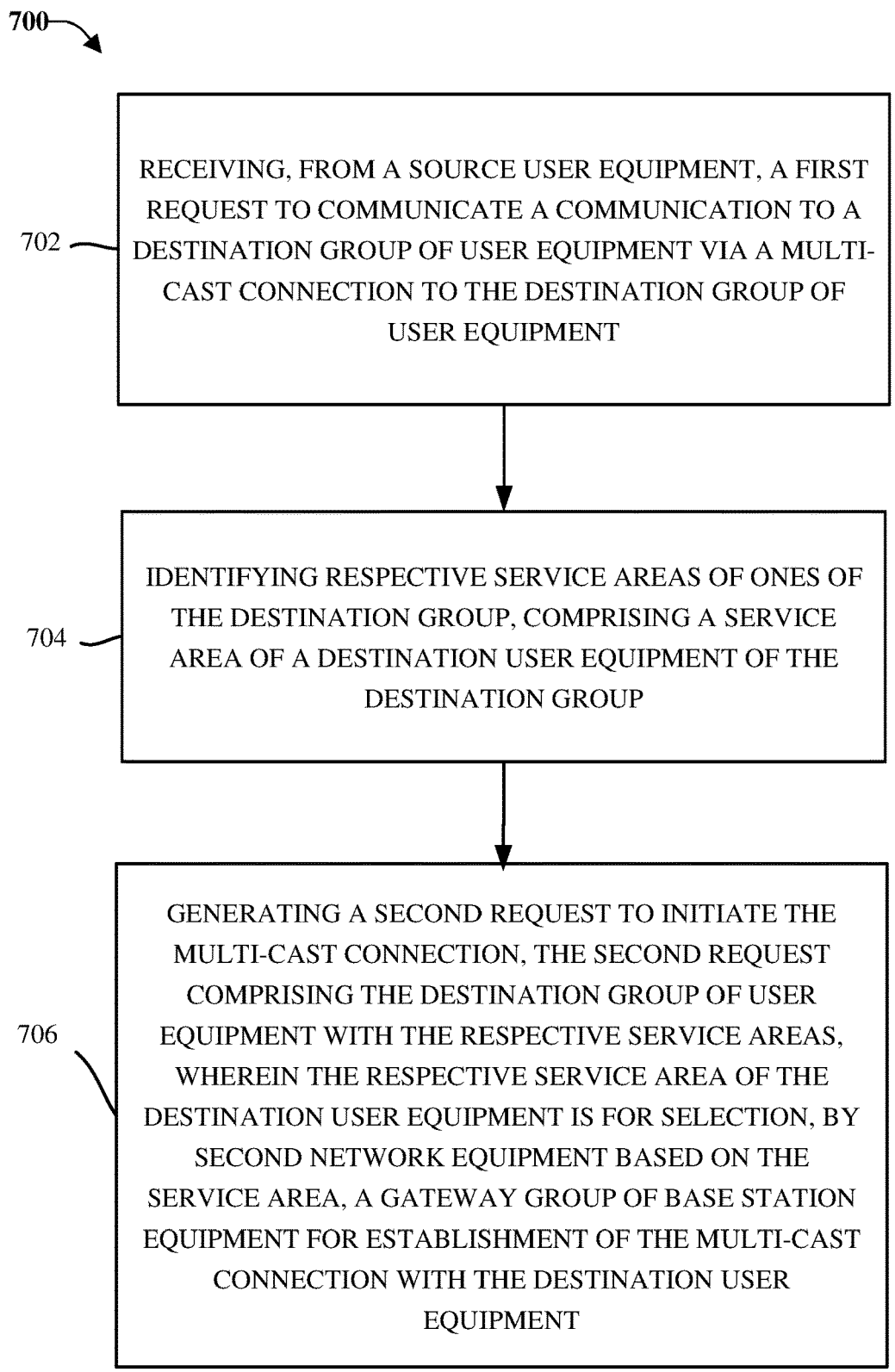
FIG. 7 illustrates a flow diagram of an example method that can facilitate location-based allocation of resources for PTT communications, in accordance with one or more embodiments.

FIG. 7 illustrates a flow diagram of an example method 700 that can facilitate location-based allocation of resources for PTT communications, in accordance with one or more embodiments. For purposes of brevity, description of like elements and/or processes employed in other embodiments is omitted.

At 702, method 700 can comprise receiving, from a source user equipment, a first request to communicate a communication to a destination group of user equipment via a multi-cast connection to the destination group of user equipment. At 704, method 700 can further comprise identifying respective service areas of ones of the destination group, comprising a service area of a destination user equipment of the destination group.

At 706, method 700 can comprise generating a second request to initiate the multi-cast connection, the second request comprising the destination group of user equipment with the respective service areas, wherein the respective service area of the destination user equipment is for selection, by second network equipment based on the service area, a gateway group of base station equipment for establishment of the multi-cast connection with the destination user equipment.

Figure 8:
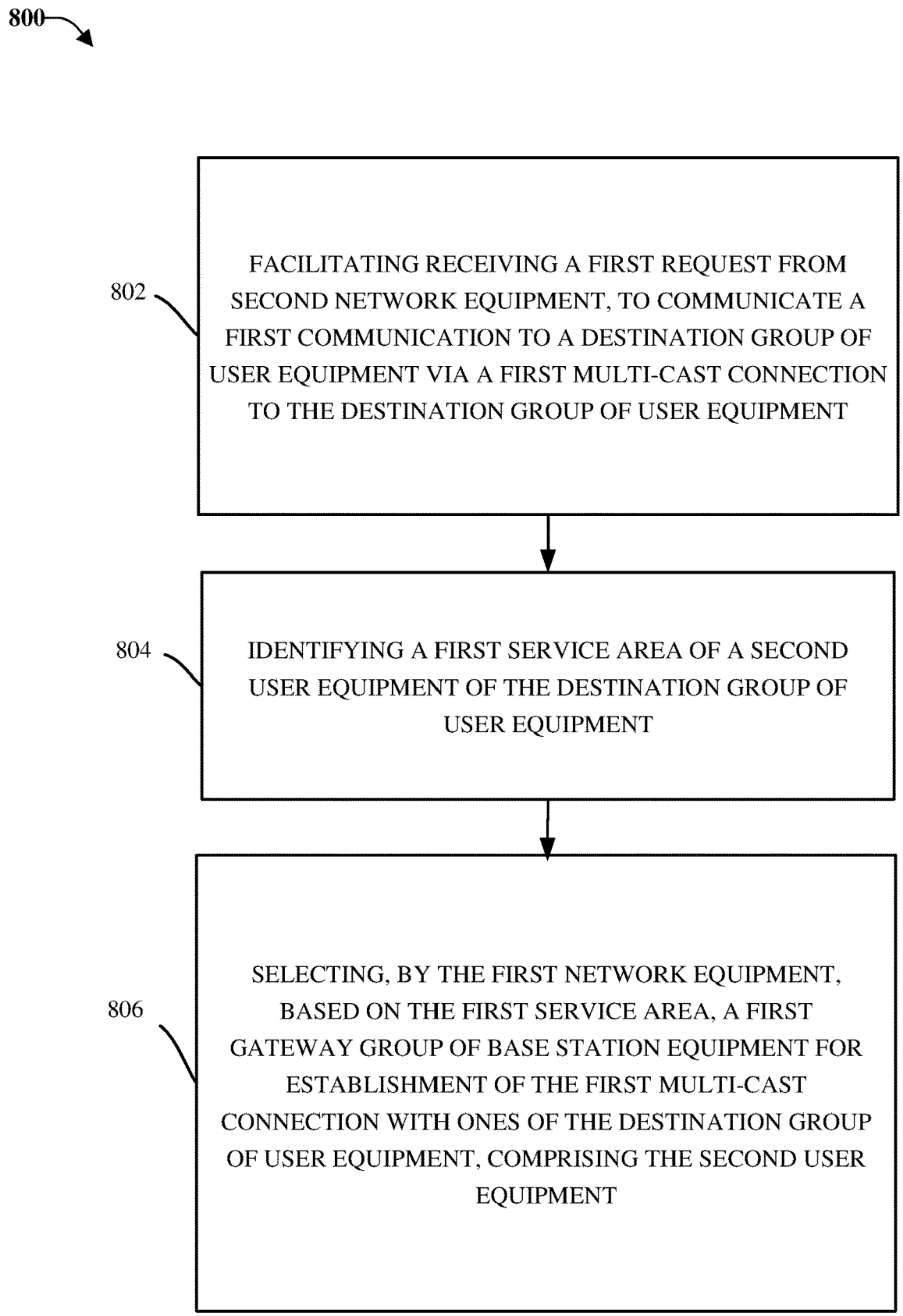
FIG. 8 illustrates a flow diagram of an example method that can facilitate location-based allocation of resources for PTT communications, in accordance with one or more embodiments.

FIG. 8 illustrates a flow diagram of an example method 800 that can facilitate location-based allocation of resources for PTT communications, in accordance with one or more embodiments. For purposes of brevity, description of like elements and/or processes employed in other embodiments is omitted.

At 802, method 800 can comprise facilitating receiving a first request from second network equipment, to communicate a first communication to a destination group of user equipment via a first multi-cast connection to the destination group of user equipment. At 804, method 800 can comprise identifying a first service area of a second user equipment of the destination group of user equipment. At 806, method 800 can comprise selecting, based on the first service area, a first gateway group of base station equipment for establishment of the first multi-cast connection with ones of the destination group of user equipment, comprising the second user equipment.

It is to be appreciated that one or more embodiments described herein can utilize various combinations of electrical components, mechanical components, mass storage, circuitry, and extensive, repetitive, rapidly performed, and complicated analysis of data that cannot be replicated in the mind of a human or performed by any number of humans working together. One or more embodiments can provide a technical solution to a technical problem by processing and analyzing utilization data of network slices with functions beyond the capability of a human mind, e.g., the operations of network components including, but not limited to, network interface.

According to several embodiments, system 100 can also be fully operational towards performing one or more other functions (e.g., fully powered on, fully executed, etc.) while also performing the various operations of a network control system of information sharing that are described and suggested herein. It should be appreciated that such simultaneous multi-operational execution is beyond the capability of a human mind. It is to be appreciated that one or more embodiments can obtain, analyze, and process information that is impossible to obtain, analyze, and process manually by an entity, such as a human user.

Figure 9:
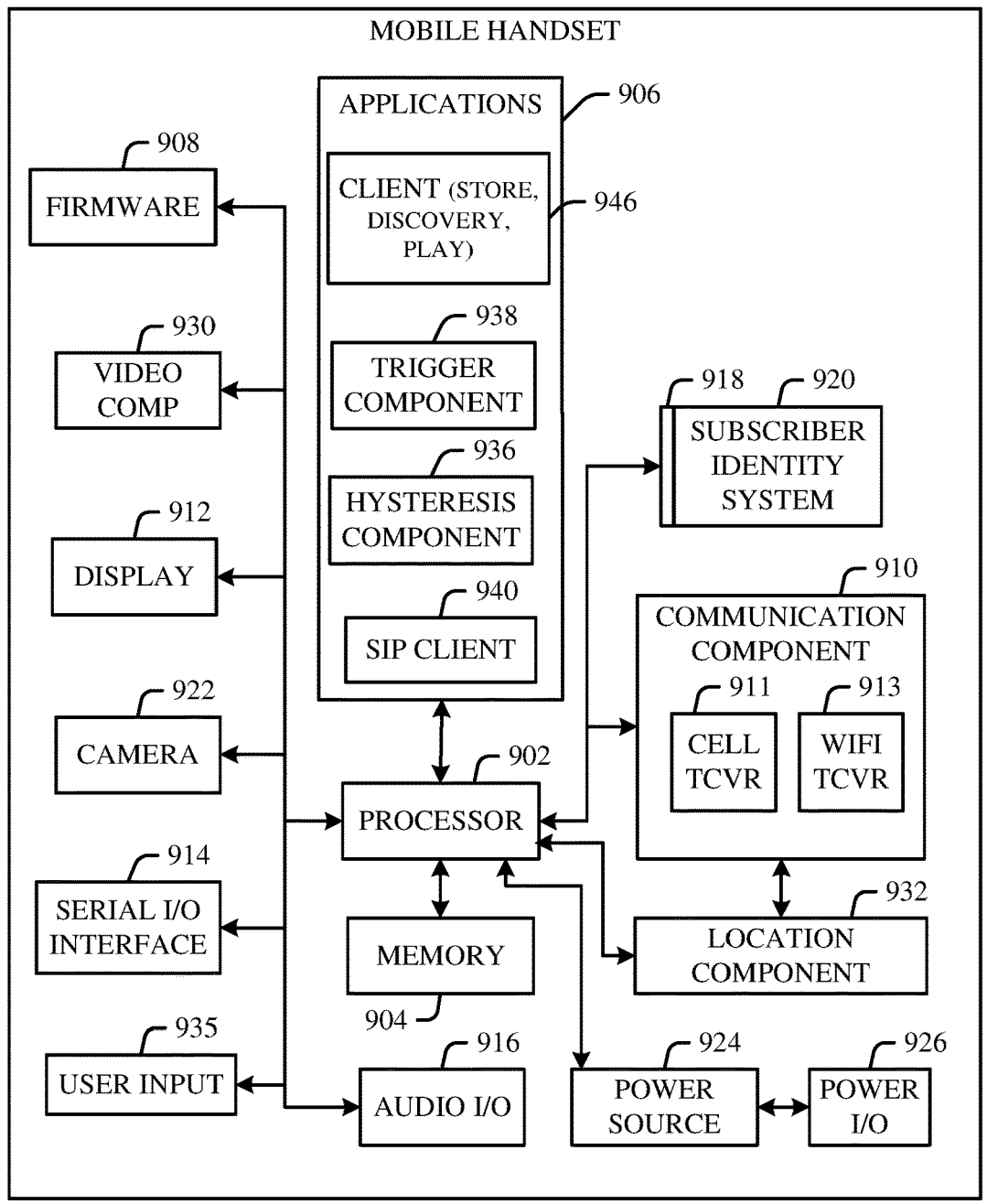
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, cloud computing environments and the like, each of which can be operatively coupled to one or more associated devices.

As used with discussions of some embodiments herein, a cloud computing environment, the cloud, or other similar terms can refer to computing that can share processing resources and data to one or more computer and other device on an as needed basis to facilitate access to a shared pool of configurable computing resources that can be provisioned and released readily. For example, the preferential allocation of network resources to responder device 140 and network device 150 described above can be facilitated by flexible allocation of cloud computing resources, in accordance with one or more embodiments described herein.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and trouble-shooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

As discussed with FIG. 1, network 190 can include a wireless communication system, and thus can include one or more communication service provider networks that facilitate providing wireless communication services to various user equipments included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.).

The network device 150 can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

As noted above, network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., event responder device 140 and network device 150) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:

receiving, by first base station equipment, a first indication of a first gateway group of base station equipment serving a first service area comprising a destination group of user equipment comprising a first user equipment with multicast reception capabilities and a second user equipment without the multicast reception capabilities, wherein the first gateway group of base station equipment comprises the first base station equipment, wherein a second gateway group of base station equipment further serves the first service area, wherein the first base station equipment comprises first communication capabilities capable of broadcasting to the first user equipment and unicasting to the second user equipment, wherein the first gateway group of base station equipment comprises second base station equipment comprising second communication capabilities not capable of the broadcasting to the first user equipment and capable of the unicasting to the second user equipment, and wherein the second gateway group of base station equipment comprises third base station equipment comprising the first communication capabilities; and based on an assessment being made that the first gateway group of base station equipment comprises the second communication capabilities, receiving, by the first base station equipment, a second indication that the first gateway group of base station equipment was selected, from among a plurality of gateway groups of base station equipment including the first gateway group of base station equipment and the second gateway group of base station equipment, for a communication to the first user equipment and the second user equipment, wherein the first gateway group of base station equipment is selected for the communication based on unicast connections being able to be established by the first gateway group of base station equipment with the second communication capabilities faster than by the second gateway group of base station equipment without the second communication capabilities.

2. The method of claim 1, wherein the first base station equipment comprises a multiprocessor system.

3. The method of claim 1, wherein the first indication includes identifiers of the destination group of user equipment.

4. The method of claim 1, wherein a multicast communication comprises a multimedia broadcast multicast service communication.

5. The method of claim 1, wherein the communication comprises a push to talk communication in accordance with a push to talk service.

6. The method of claim 1, wherein the second user equipment not having the multicast reception capabilities was determined by the second user equipment.

7. The method of claim 1, wherein the multicast reception capabilities comprise communication capabilities for the communication via multimedia broadcast multicast service connections.

8. The method of claim 1, further comprising retrieving, by the first base station equipment, mapping information corresponding to a mapping of the first service area, wherein the first service area is able to be identified based on the mapping information.

9. The method of claim 1, wherein the second base station equipment serves the first service area based on a record mapping the first user equipment and the second user equipment to the first service area.

10. The method of claim 1, further comprising:
identifying, by the first base station equipment, a second service area of a third user equipment; and
based on the second service area and the third user equipment comprising the multicast reception capabilities, selecting, by the first base station equipment, a third gateway group of base station equipment to communicate with the third user equipment.

11. A first base station device, comprising:
a processor; and
a memory that stores executable instructions that, when executed by the processor, facilitate performance of operations, the operations comprising:
receiving an indication of a first group of base station devices serving an area comprising a receiving group of user equipment comprising a first user equipment with multicast reception capabilities and a second user equipment without the multicast reception capabilities, wherein the first group of base station devices comprises the first base station device, wherein a second group of base station devices further serves the area, wherein the first base station device of the first group of base station devices comprises first communication capabilities that enable broadcasting to the first user equipment and enable unicasting to the second user equipment, wherein the first group of base station devices further comprises a second base station device comprising second communication capabilities that do not enable the broadcasting to the first user equipment and enable the unicasting to the second user equipment, and wherein the second group of base station devices comprises a third base station device comprising the first communication capabilities; and
based on an assessment being made that the first group of base station devices comprise the second communication capabilities, receiving a selection indication that the first group of base station devices was selected, from among a plurality of groups of base station devices including the first group of base station devices and the second group of base station devices, for a communication to the first user equipment and the second user equipment, wherein the first group of base station devices is selected for the communication based on unicast connections being able to be established by the first group of base station devices with the second communication capabilities faster than by the second group of base station devices without the second communication capabilities.

12. The first base station device of claim 11, wherein the receiving group of user equipment was selected based on identified capabilities of a user equipment of the receiving group, and wherein the identified capabilities of the user equipment were provided by the user equipment based on an analysis by the user equipment.

13. The first base station device of claim 11, wherein the first base station device is configured to communicate according to a push to talk service, and wherein the communication comprises a push to talk communication.

14. A non-transitory machine-readable medium, comprising executable instructions that, when executed by a processor of first base station equipment, facilitate performance of operations, the operations comprising:
receiving a first indication of a first gateway group of base station equipment serving a service area comprising a destination group of user equipment comprising a first user equipment with multicast reception capabilities and a second user equipment without the multicast reception capabilities, wherein the first gateway group of base station equipment comprises the first base station equipment, wherein a second gateway group of base station equipment further serves the service area, wherein the first base station equipment comprises first communication capabilities capable of broadcasting to the first user equipment and unicasting to the second user equipment, wherein the first gateway group of base station equipment further comprises second base station equipment comprising second communication capabilities not capable of the broadcasting to the first user equipment and capable of the unicasting to the second user equipment, and wherein the second gateway group of base station equipment comprises third base station equipment comprising the first communication capabilities; and
based on an assessment being made that the first gateway group of base station equipment comprises the second communication capabilities, receiving, by the first base station equipment, a second indication that the first gateway group of base station equipment was selected, from among a plurality of gateway groups of base station equipment including the first gateway group of base station equipment and the second gateway group of base station equipment, for a communication to the first user equipment and the second user equipment, wherein the first gateway group of base station equipment is selected for the communication based on unicast connections being able to be established by the first gateway group of base station equipment with the second communication capabilities faster than by the second gateway group of base station equipment without the second communication capabilities.

15. The non-transitory machine-readable medium of claim 14, wherein the operations further comprise updating a stored record of a mapping of the service area from the first gateway group of base station equipment to an updated gateway group of base stations.

16. The non-transitory machine-readable medium of claim 14, wherein the first gateway group of base station equipment operates in an evolved packet core framework.

17. The non-transitory machine-readable medium of claim 14, wherein the operations further comprise receiving a push to talk session initiation request.

18. The method of claim 1, wherein the user equipment comprises one or more of a smart phone, a laptop, or a tablet.

19. The first base station device of claim 11, wherein the processor is part of a multiprocessor system.

20. The non-transitory machine-readable medium of claim 14, wherein the processor is part of a distributed system.

\* \* \* \* \*